US008682839B2

(12) United States Patent
Li et al.

(10) Patent No.: US 8,682,839 B2
(45) Date of Patent: Mar. 25, 2014

(54) PREDICTING KEYWORD MONETIZATION

(75) Inventors: Hua Li, Beijing (CN); Zheng Chen, Beijing (CN); Jian Wang, Beijing (CN)

(73) Assignee: Microsoft Corporation, Redmond, WA (US)

( * ) Notice: Subject to any disclaimer, the term of this patent is extended or adjusted under 35 U.S.C. 154(b) by 1365 days.

(21) Appl. No.: 12/131,125

(22) Filed: Jun. 2, 2008

(65) Prior Publication Data

US 2009/0299855 A1  Dec. 3, 2009

(51) Int. Cl.
*G06F 17/30* (2006.01)
*G06Q 40/00* (2012.01)

(52) U.S. Cl.
USPC ................................. 707/3; 705/35

(58) Field of Classification Search
USPC ................................. 707/3; 705/35
See application file for complete search history.

(56) References Cited

U.S. PATENT DOCUMENTS

| | | | |
|---|---|---|---|
| 2004/0088241 A1 | 5/2004 | Rebane et al. | |
| 2004/0199664 A1* | 10/2004 | Feldman et al. | 709/238 |
| 2005/0065844 A1 | 3/2005 | Raj et al. | |
| 2005/0097204 A1 | 5/2005 | Horowitz et al. | |
| 2005/0144065 A1 | 6/2005 | Calabria et al. | |
| 2006/0173822 A1* | 8/2006 | Watson et al. | 707/3 |
| 2006/0202037 A1* | 9/2006 | Gunawardena et al. | 235/462.15 |
| 2006/0212350 A1 | 9/2006 | Ellis et al. | |
| 2006/0259473 A1 | 11/2006 | Li et al. | |
| 2007/0100708 A1* | 5/2007 | Smith et al. | 705/26 |
| 2007/0162329 A1 | 7/2007 | Lee | |
| 2007/0162379 A1 | 7/2007 | Skinner | |
| 2007/0203903 A1 | 8/2007 | Attaran Rezaei et al. | |

OTHER PUBLICATIONS

Weston Anson; Schioldager, Rick. "Identifying valuable intellectual property in bankruptcy"; American Bankruptcy Institute Journal; Jun. 2002.*
Deegan, Matthew; "MGM/YouTube Partnership "not a big deal", says industry expert"; SNL Kagan Media & Communications Reports; Nov. 11, 2008.*
Richardson, et al., "Predicting Clicks: Estimating the Click-Through Rate for New Ads", Proceedings of the 16th international conference on World Wide Web, Banff, Alberta, Canada, Session: Advertisements & click estimates, May 8-12, 2007, pp. 521-529.
"Search Insider Summit: Search Ad Intelligence from Microsoft", http://www.marketingpilgrim.com/2007/12/search-insider-summit-search-ad-intelligence-from-microsoft.html.
"Optimizing for Spend Efficiency", http://help.yahoo.com/l/us/yahoo/ysm/sps/advtopics/optimizing_spend_efficiency.html.
Feldman, et al., "Budget Optimization in Search-Based Advertising Auctions", Dec. 8, 2006, pp. 1-15.

* cited by examiner

*Primary Examiner* — Edward Chang
(74) *Attorney, Agent, or Firm* — Carole Boelitz; Micky Minhas

(57) ABSTRACT

Embodiments of the claimed subject matter provide a method and system for predicting bidding keyword monetization. The claimed subject matter provides a method and system with which the value of a keyword for the purpose of relevant online advertisement may be evaluated according to various metrics to determine a bidding landscape for use in advertising campaigns. The value of the keyword considers certain attributes related to the monetization of the keyword.

One embodiment of the claimed subject matter is implemented as a method for predicting keyword monetization for one or more keyword-advertisement relationships. Historical data for the one or more keyword-advertisement relationships is referenced and used to generate a global model of the one or more keyword-advertisement relationship. The relationships are then evaluated according to a time-series analysis, which parses the data from the historical data and the global model to create predictions for the keyword monetization according to the keyword-advertisement relationships.

24 Claims, 5 Drawing Sheets

PREDICTING KEYWORD MONETIZATION

BACKGROUND

The online advertising industry has grown dramatically in recent years, a reflection of the astronomical increase in Internet usage and the growing rate of commerce transacted over the Internet. As such, the efficient management of advertising campaigns has become crucial for advertisers to remain competitive and to achieve business-oriented objectives.

An advertisement over the Internet typically includes one or more textual or graphical URL links representative of the good or service the advertiser is advertising and/or proffering to sell. Clicking on the link(s) will direct the viewer to a "landing page," generally a webpage owned and/or controlled by the advertiser, but which may also be a directory of aggregated links to other landing pages of advertisers of equivalent or similar goods or services. The advent of search engines and popular content-specific websites has further refined and focused the Internet advertising industry.

A significant portion of advertising over the internet now consists of advertisements displayed by a search engine. For example, search engines that generate a search result list from one or more user-inputted search terms ("keywords") have been adapted to incorporate one or more advertisements featuring goods or services related to the keywords in the returned search result list. In some cases, the search result list displayed to the user features a list of one or more advertisements ranked by the search engine, typically according to the relevancy of the advertisement (or the advertisement's proffered goods or services) to the search query. Accordingly, advertisers may compete with other advertisers offering similar goods and services which may share a common keyword for position on a search result list for the keyword.

The emergence of advertisement over the Internet through the use of search engines has also expanded traditional methods of calculating advertising fees—subsequently influencing the behavior of advertising campaigns and advertising strategies. Advertisement publishers for traditional advertisement mediums, such as those displayed on physical structures (e.g., billboards) or published over media broadcasts (e.g., television and radio), typically charge rates based on the physical attributes of the occupied medium (e.g., the size or position of a billboard or newspaper advertisement) or for the duration of a discrete increment of time (for radio and television broadcasts).

Naturally, advertising campaigns for advertisements on all mediums are typically designed to maximize exposure of the advertisement to the target demographic or general public (e.g., by targeting popular television programs or sporting events, displaying advertisements along major highways or highly visible structures). However, the effectiveness of an advertisement (i.e., the consumption or heightened consumer interest in the good or service being advertised that is directly or indirectly attributable to the advertisement) over traditional advertisement mediums is extremely difficult to calculate with any amount of precision, and may actually be realized months or even years after the expiration of an advertisement campaign.

In contrast, advertisers and publishers of advertisements over the Internet, due to the ability to monitor user activity and website traffic, are able to accurately and automatically account for both increased consumption as well as presumed heightened consumer interest immediately. For example, for an advertisement displayed on a website or in a list of search results from a search engine, the publisher of the advertisement (typically the owner of the website or search engine) is able to control and track the number of times the advertisement is displayed (also known as "impressions"), as well as the number of Internet users that navigate to the landing page of the advertisement by clicking through the advertisement (the act of navigating by physically clicking on a URL link, is known as a "clickthrough"). The rate of navigating users, known as the "clickthrough rate" therefore represents the number of Internet users that navigate to the landing page of the advertisement for each display of the advertisement. A "conversion" is a term used for the number of clickthrough users that actually purchase the proffered good or service from the advertiser.

Internet advertisement publishers, and in particular the advertisement publishers which display advertisements in conjunction with a search engine, will often employ a fee structure that includes a base rate that includes incentives for each clickthrough and/or conversion generated by the advertisement. The entire fee structure is sometimes known as a "bidding price." Advertisement publishers which employ a search engine to display advertisements may display a list of advertisements from various competing advertisers, with the list of advertisements ranked by relevancy to the search query, and perhaps adjusted to reflect the estimated revenue generated from the advertiser's bidding price (i.e., advertisers with higher bidding prices may be ranked higher than advertisers with lower bidding prices). Thus, online advertising campaigns should be able to appropriately track and accurately predict a keyword-advertisement's performance to be able to offer a competitive bidding price and to adjust their advertising campaigns to maximize future performance.

Furthermore, many search engines actively account for the number of times the search engine is queried with a search for specific terms or phrases. Some popular search engines even display the most popular ("hottest") search queries over a given period of time (typically a month or less) to other users of the search engine. An increased number of search queries for a keyword or a sequence of keywords is typically indicative of a heightened public interest in the subject of the keyword(s). However, topics of interest may be seasonal (e.g., gifts during the holidays) or fleeting (singular event or occurrence). As such, predicting future performance becomes even more difficult due to the uncertainty or fluctuation inherent in trends.

Unfortunately, there is no conventionally known or universally practiced method of predicting future keyword performance. One employed method is through monetizing keyword bidding to approximate the value of the keyword to an advertiser and/or advertising campaign. Keyword monetization can be estimated by determining certain attributes related to advertiser-specific keyword performance. However, keyword performance fluctuates frequently, changing from day to day or even hour to hour according to "hot" trends. Accordingly, advertising campaigns which consist of ad-hoc estimations of cost and effectiveness based solely on recent keyword performance can often result in wildly unexpected outcomes.

SUMMARY

This Summary is provided to introduce a selection of concepts in a simplified form that is further described below in the Detailed Description. This Summary is not intended to identify key features or essential features of the claimed subject matter, nor is it intended to be used to limit the scope of the claimed subject matter.

The claimed subject matter is directed to generating a bidding keyword landscape. Specifically, the claimed subject matter provides a method and system from which a monetized keyword may be predicted to calculate appropriate bidding positions for advertisement campaigns. Monetization of the keyword is derived from global keyword data collected from the history of performance of an advertiser-keyword relationship supplemented with a time-series analysis of the global keyword data.

One embodiment of the claimed subject matter is implemented as a method for predicting keyword monetization for one or more keyword-advertisement relationships. Historical data for the one or more keyword-advertisement relationships is referenced and used to generate a global model of the one or more keyword-advertisement relationship. The relationships are then evaluated according to a time-series analysis, which parses the data from the historical data and the global model to create predictions for the keyword monetization according to the keyword-advertisement relationships.

Another embodiment of the claimed subject matter is implemented as a method for generating a keyword performance landscape. A data resource which stores historical data for a keyword-advertisement relationship is referenced. The historical data is used to predict keyword monetization, which includes generating a global model of the keyword-advertisement relationship and an evaluation of the keyword-advertisement relationship according to a time-series analysis. The predicted keyword monetization is then used to generate a keyword performance landscape.

DETAILED DESCRIPTION

Figure 1:
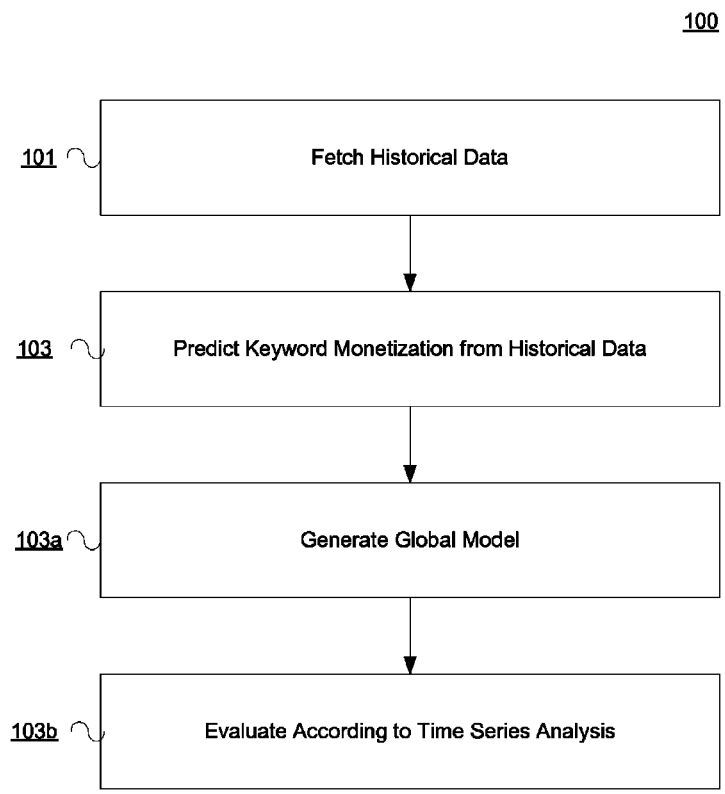
FIG. 1 depicts a flowchart describing a process for predicting keyword monetization for a period of time for one or more advertisements corresponding to a keyword from one or more advertisers according to various embodiments.

Reference will now be made in detail to embodiments of the claimed subject matter, a method and system for predicting bidding keyword monetization, examples of which are illustrated in the accompanying drawings. While the claimed subject matter will be described in conjunction with the embodiments, it will be understood that they are not intended to be limited to these embodiments. On the contrary, the claimed subject matter is intended to cover alternatives, modifications and equivalents, which may be included within the spirit and scope as defined by the appended claims.

Furthermore, in the following detailed descriptions of embodiments of the claimed subject matter, numerous specific details are set forth in order to provide a thorough understanding of the claimed subject matter. However, it will be recognized by one of ordinary skill in the art that the claimed subject matter may be practiced without these specific details. In other instances, well known methods, procedures, components, and circuits have not been described in detail as not to unnecessarily obscure aspects of the claimed subject matter.

Some portions of the detailed descriptions which follow are presented in terms of procedures, steps, logic blocks, processing, and other symbolic representations of operations on data bits that can be performed on computer memory. These descriptions and representations are the means used by those skilled in the data processing arts to most effectively convey the substance of their work to others skilled in the art. A procedure, computer generated step, logic block, process, etc., is here, and generally, conceived to be a self-consistent sequence of steps or instructions leading to a desired result. The steps are those requiring physical manipulations of physical quantities. Usually, though not necessarily, these quantities take the form of electrical or magnetic signals capable of being stored, transferred, combined, compared, and otherwise manipulated in a computer system. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from the following discussions, it is appreciated that throughout the claimed subject matter, discussions utilizing terms such as "storing," "creating," "protecting," "receiving," "encrypting," "decrypting," "destroying," or the like, refer to the action and processes of a computer system or integrated circuit, or similar electronic computing device, including an embedded system, that manipulates and transforms data represented as physical (electronic) quantities within the computer system's registers and memories into other data similarly represented as physical quantities within the computer system memories or registers or other such information storage, transmission or display devices.

Accordingly, embodiments of the claimed subject matter provide a method and system for predicting bidding keyword monetization. The claimed subject matter provides a method and system for predicting bidding keyword monetization, from which a keyword performance landscape may be constructed for use with online advertising campaigns. Predicting bidding keyword monetization according to the claimed subject matter considers the potential of the keyword for a present, imminent, or future period of time as well as the historical performance data for the keyword over the lifetime of the advertisement from an advertiser. Embodiments of the claimed subject matter and its benefits are further described below.

FIG. 1 depicts a flowchart describing a process 100 for predicting keyword monetization for a period of time for one or more advertisements corresponding to a keyword from one or more advertisers. Steps 101-103 describe exemplary steps comprising the process 100 in accordance with the various embodiments herein described.

At step 101, historical data for the performance of the advertisements corresponding to a keyword from one or more advertisers is fetched. Advertisements produced by an advertiser for advertising through an association with a keyword (e.g., in advertisements displayed by a search engine) comprise a keyword-advertiser relationship. The keyword-advertiser relationship may include the entire history of advertising between the advertiser and the advertisement publisher with respect to the keyword. Alternatively, the keyword-advertiser relationship may also be limited to one or more advertising campaigns engaged by the keyword-advertiser relationship.

The historical data may be fetched from a data resource where the data is stored, such as a database. The historical performance data includes keyword monetization property corresponding to the advertisements for each keyword-advertiser relationship. The monetization property comprising the historical performance data may include attributes of the keyword-advertiser relationship such as bidding prices submitted by advertisers to advertise with the keyword, the cost to the advertiser to advertise with the keyword; and the number of impressions, click numbers, and conversions generated by advertisements corresponding to the keyword over the life of the keyword-advertiser relationship.

For embodiments in which an advertisement is displayed in a search result list generated by a search engine in response to a search query that includes the keyword, the monetization property may also include the average position achieved by an advertisement corresponding to the keyword from an advertiser in search result lists for search queries that include the keyword.

In one embodiment, the number of impressions generated by the advertisement, click numbers generated by the advertisement, cost to the advertiser for advertising with the keyword and conversions generated by the advertisement are further calculated at a daily rate (e.g., the number of impressions generated by the advertisement, on average, per day). While embodiments may typically describe or include examples featuring daily calculations, the claimed subject matter is not limited to such, and other denominations of time, such as week, month, or year are also applicable.

At step 103, keyword monetization property for a keyword-advertiser relationship is predicted from the historical data for the performance of the advertisements corresponding to a keyword from one or more advertisers fetched at step 101. Keyword monetization is predicted by generating a global model (step 103a) for the keyword and evaluating the keyword-advertiser relationships according to a time series analysis (step 103b) to predict the values of the attributes of keyword monetization for the discrete period of time.

At step 103a, a global model incorporating the one or more keyword-advertiser relationships is generated to ensure a stable performance landscape for each keyword-advertiser relationship. The global model is generated from the historical data obtained in step 101, and aggregates the performances of the keyword-advertiser relationships, with respect to advertisements corresponding to the keyword.

According to one embodiment, generating a global model incorporating the one or more keyword-advertiser relationships further includes calculating an average cost per click rate and a clickthrough rate for a period of time for the one or more keyword-advertiser relationships. The cost per click rate is calculated from the historical keyword monetization data included in the global model. The cost per click rate may be calculated as an average rate over a period of time (e.g., a daily cost per click) for some or all of the keyword-advertiser relationships. The cost per click rate for a keyword-advertiser relationship is calculated by dividing the cost to the advertiser by the number of clicks generated by advertisements from the keyword-advertiser relationship for the specified period of time. For example, a daily cost per click rate would be the average cost per click rate per day over the course of the keyword-advertiser relationship.

The clickthrough rate generated over the course of the keyword-advertiser relationship is also calculated from the historical keyword monetization data included in the global model. The clickthrough rate may be calculated as an average rate of the number of clicks generated by advertisements from the some or all of the keyword-advertisers. The clickthrough rate for a keyword-advertiser relationship in a period of time is calculated by dividing the number of clicks generated by advertisements from the keyword-advertiser relationship by the number of impressions from the keyword-advertiser in the same period of time. For example, a daily clickthrough rate would be the average clickthrough rate generated by the keyword-advertiser per day, over the course of the keyword-advertiser relationship.

At step 103b, the one or more keyword-advertiser relationships are evaluated according to a time-series analysis, with applicable expected constraints provided by the global model. Evaluation according to a time-series analysis allows for a smoother, more accurate alignment for the prediction of keyword performance for the intended period of time to current performance. Evaluation of a keyword according to a time-series analysis considers the average position for the keyword as determined from the generated global model and predicts keyword monetization according to derived attributes while applying constraints from the generated global model.

Figure 2:
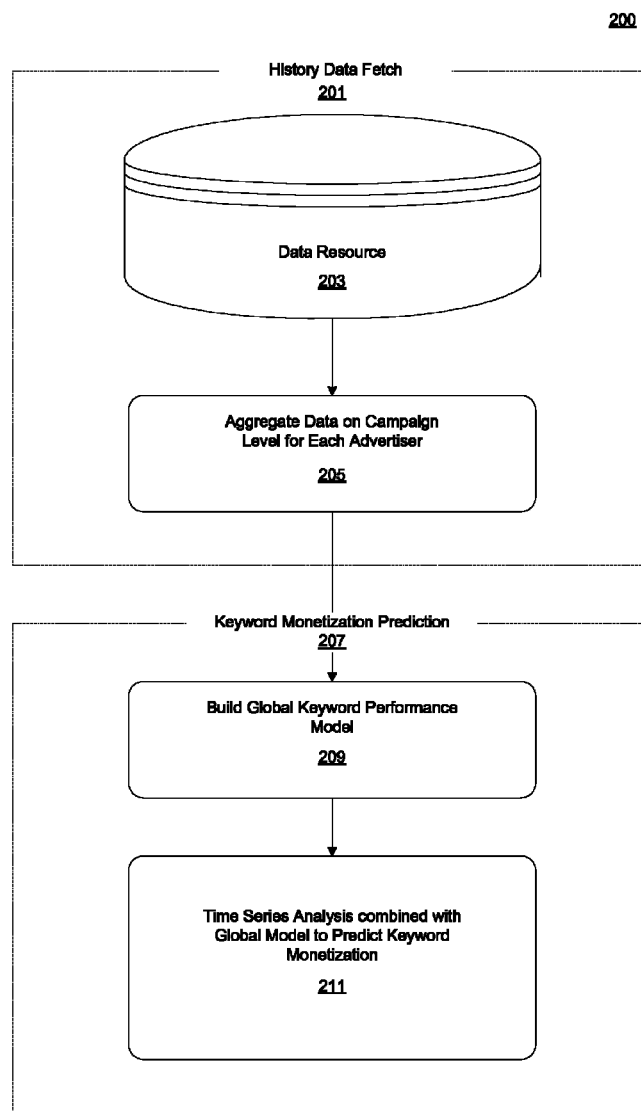
FIG. 2 is a diagram depicting a process for predicting keyword monetization for one or more advertisers corresponding to a keyword in one or more keyword-advertiser relationships according to various embodiments.

FIG. 2 is a diagram 200 depicting a process for predicting keyword monetization for one or more advertisers corresponding to a keyword in one or more keyword-advertiser relationships according to the method described in steps 101-103 of FIG. 1, and in accordance with the various embodiments herein described.

Diagram 200 includes two steps, a history data fetch 201 and a keyword monetization prediction 207. The history data fetch step 201 corresponds to step 101 of fetching historical data for the one or more keyword-advertiser relationships, and includes obtaining historical data from a data resource at step 203. The historical data obtained from the data resource at step 203 is aggregated on a campaign level for the one or more advertisers at step 205.

The keyword monetization prediction step 207 corresponds to step 103 and includes a step for generating a global model for the keyword performance 209 and a time series analysis of the keyword performance 211, which is combined with the global model generated at step 209 to predict the keyword monetization. Generating a global model for keyword performance and evaluating a keyword performance according to a time-series analysis have been described in detail from the description of FIG. 1. As such, repetition of the description will be herein omitted.

Figure 3:
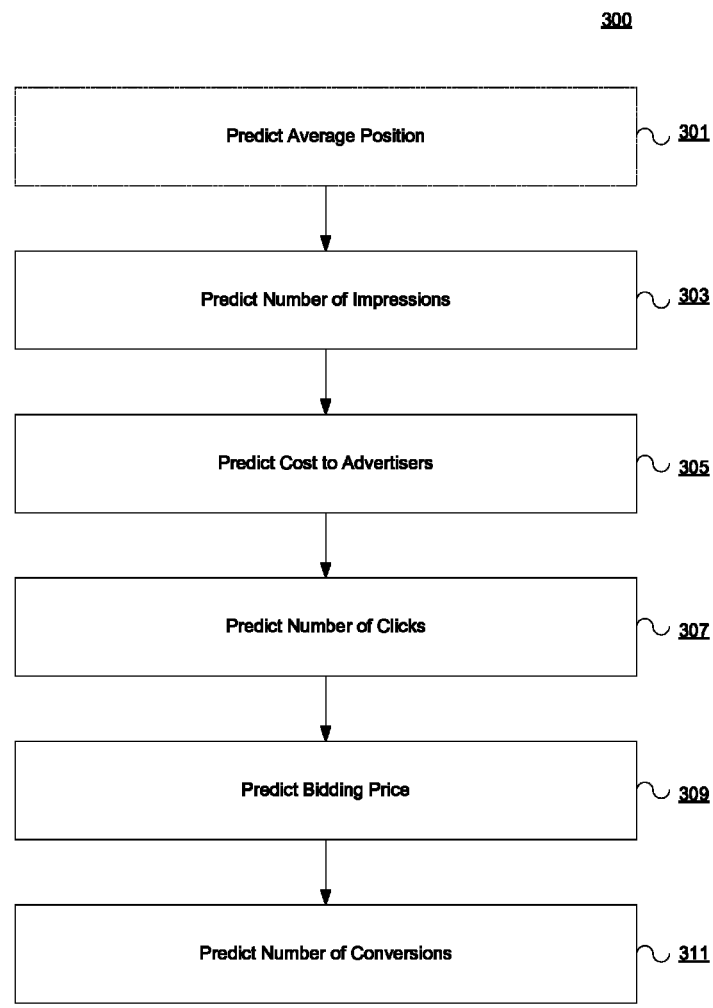
FIG. 3 depicts a flowchart describing a process for evaluating a keyword according to a time series analysis according to various embodiments.

FIG. 3 depicts a flowchart describing a process 300 for evaluating a keyword according to a time series analysis. Steps 301-311 describe exemplary steps comprising the process 300 in accordance with the various embodiments herein described.

In embodiments which include advertisements displayed in a search result list generated by a search engine in response to a search query for one or more keywords corresponding to the advertising campaign, the average positions of one or more advertisements from a keyword-advertiser relationship which correspond to one or more keywords in a search result list generated by a search engine in response to a search query for the one or more keywords for a period of time is predicted at step 301. The average position for a period of time is predicted from the average position of advertisements in the advertising campaign corresponding to the same one or more keywords for an equivalent period of time over the course of the advertiser-keyword relationship, as provided by the historical data contained in the global model.

For example, to predict a daily average position for the next day, the average daily position of advertisements from a keyword-advertiser position is considered. After the average daily position of the advertisements over the course of the advertiser-keyword relationship is calculated, one or more regressions models are applied to the data to predict the next-day daily average position. These regression models may include linear regression, least-square regression and slope-based regression. Each of the enumerated regression models are well known in the art and, accordingly, a detailed description shall be omitted. The prediction from the one or more regression models would be merged to eliminate duplicated predictions.

At step 303, the number of impressions of an advertisement in an advertising campaign which correspond to one or more keywords for a period of time is predicted. In one embodiment, the period of time is a day. The number of impressions for a period of time (such as a day) is predicted from historical impression data for equivalent periods of time over the history of the advertiser-keyword relationship, as provided by the historical data contained in the global model. Additional constraints from the global model are applied to ensure a distribution with respect to daily average positions.

At step 305, the number of clicks generated by an advertisement corresponding to a keyword is predicted for a period of time. In one embodiment, the number of clicks an advertisement corresponding to a keyword generates is predicted as a daily number of clicks—i.e., the number of clicks generated in one day by advertisements from an advertiser which correspond to one or more keywords. The number of clicks an advertisement generates is predicted by applying the predicted number of impressions from step 301 to the historical clickthrough rate. For example, the predicted number of impressions provides the predicted number of times in a period of time (e.g., in one day) an advertisement will be displayed. The historical rate provides the rate at which an advertisement is clicked per times the advertisement is displayed.

At step 307, the cost to advertisers to advertise with the keyword is predicted for a period of time. In one embodiment, the cost to advertisers is predicted as a daily cost—i.e., the cost predicted for an advertiser to advertiser with the keyword for a day. The cost to advertisers for advertisements corresponding to the keyword is predicted from predicted number of clicks according to step 305 while considering the cost per click as provided in the generated global model of step 103. For example, the predicted number of clicks according to step 305 predicts the number of clicks an advertisement will generate over the specified period of time. The historical cost per click provides the average cost to the advertiser for each generated click. Thus, applying the historical cost per click to the predicted number of clicks allows a prediction for the cost to the advertiser to advertiser with the keyword for a period of time.

At step 309, a conversion rate representing the conversions generated by the advertisement for a period of time is predicted. In one embodiment, the predicted conversion rate is a daily conversion rate. The conversion rate considers the historical conversion rates from the global model generated in step 103, which it applies to the number of impressions predicted in step 103

Finally, the bidding price for the advertisement is predicted at step 311. The bidding price is predicted from the predicted cost per click at step 307. The bidding price, which includes a price per click can thus be predicted from the cost per click while including slight modifications due to perceived trends or expected fluctuations (as per seasonal or holiday subjects).

Figure 4:
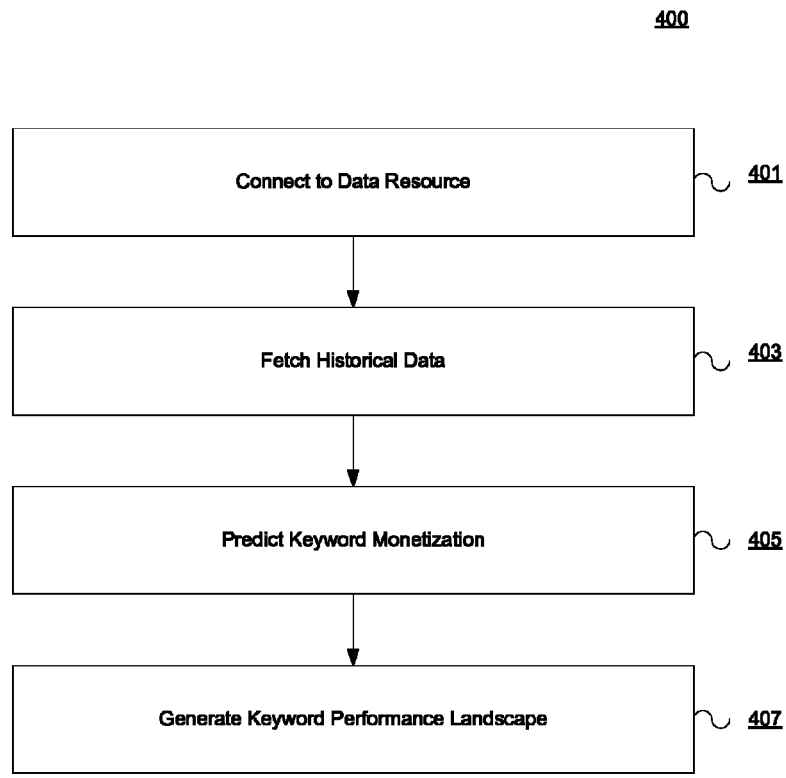
FIG. 4 depicts a flowchart describing a process for generating a keyword performance landscape for one or more advertisers corresponding to a keyword in one or more keyword-advertiser relationships according to various embodiments.

FIG. 4 depicts a flowchart describing a process 400 for generating a keyword performance landscape for one or more advertisers corresponding to a keyword in one or more keyword-advertiser relationships. Steps 401-409 describe exemplary steps comprising the process 100 in accordance with the various embodiments herein described.

At step 401, connection to a data resource is established. The data resource contains data for the one or more keyword-advertiser relationships. The data for the one or more keyword-advertiser relationships may include historical data comprising the data collected for the keyword-advertiser relationship over a substantial portion of the keyword-advertiser relationship. In other embodiments, data from the entire course of the keyword-advertiser relationship is collected in the data resource. The data resource may be implemented as any physical or electronic data repository, such as a database.

According to one embodiment, the keyword performance landscape is generated by a system for predicting keyword monetization. The system may include a data resource and a keyword monetization engine. Accordingly, the connection at step 401 is established between the keyword monetization engine and the data resource.

At step 403, the historical performance data stored in the data resource is obtained. The historical performance data may include the keyword monetization property corresponding to the one or more keyword-advertiser relationships. For example, the number of impressions an advertisement achieved from a keyword-advertiser relationship may be included within the historical performance data. The keyword monetization property for all of the keyword-advertiser relationships may be aggregated and distilled to calculate certain characteristics (e.g., the average bidding price for an advertisement from any of the keyword-advertiser relationships which corresponds to a keyword may be calculated).

At step 405, keyword monetization property for a keyword-advertiser relationship is predicted. Predicting keyword monetization property includes generating a global model incorporating the one or more keyword-advertiser relationships and evaluating the relationships according to a time-series analysis, as provided in the description of FIG. 1.

At step 407, the keyword performance landscape is generated from the predicted keyword monetization from the one or more keyword-advertiser relationships. The keyword performance landscape may consist of a representation of the historical performance of the one or more keyword-advertiser relationships as well as the predicted performance for the one or more advertisers to advertise with the keyword. In one embodiment, the landscape may be used to compare the predicted performances for the one or more advertisers to advertiser with the keyword.

In embodiments wherein the keyword performance landscape is generated by a system as a response to an external query for the keyword performance landscape, the generated keyword performance landscape is output from the system after the keyword performance landscape is generated.

Figure 5:
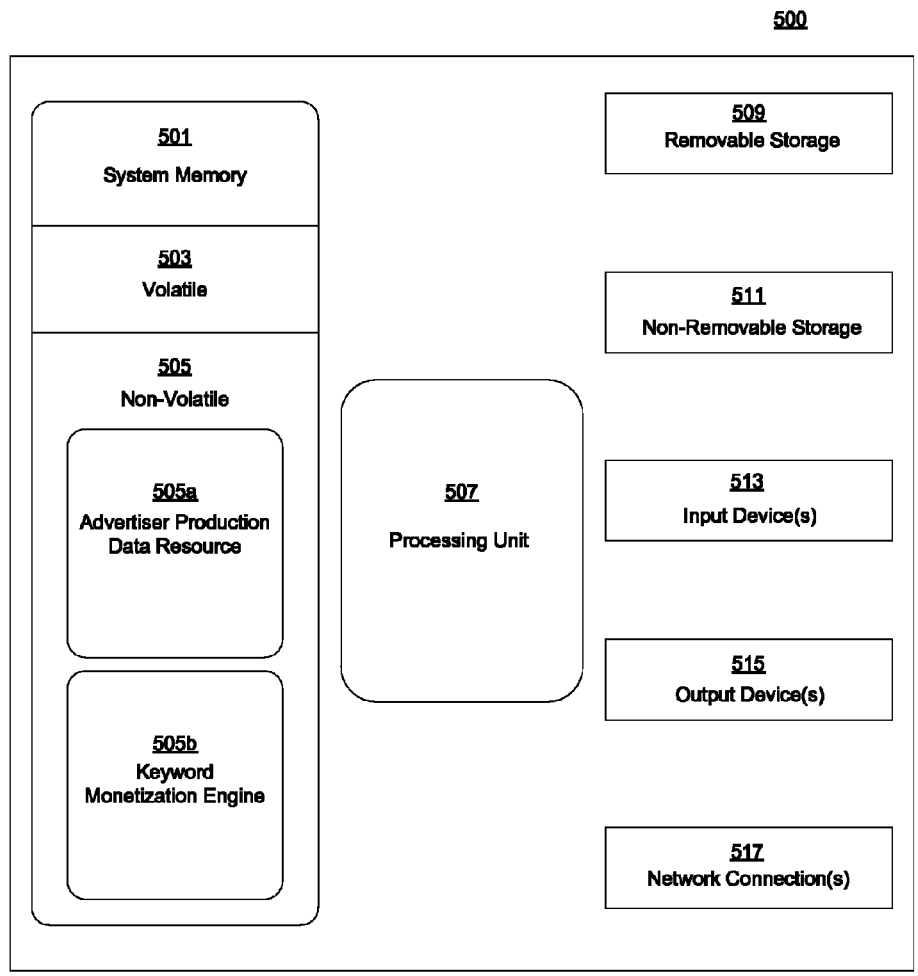
FIG. 5 depicts an exemplary computing device 500 according to various embodiments

FIG. 5 depicts an exemplary computing device 500 according to various embodiments. Computing device 500 depicts the components of a basic computer system providing the execution platform for certain software-based functionality in accordance with various embodiments. Computing device 500 can be an environment upon which the process 300 for predicting keyword monetization is instantiated. Computing device 500 can include, for example, a desktop computer system, laptop computer system or server computer system. Similarly, computing device 500 can be implemented as a handheld device (e.g., cell-phone, etc.) Computing device 500 typically includes at least some form of computer readable media. Computer readable media can be a number of different types of available media that can be accessed by computing device 500 and can include, but is not limited to, computer storage media.

In its most basic configuration, computing device 500 typically includes processing unit 507 and memory 501. Depending on the exact configuration and type of computing device 500 that is used, memory 501 can be volatile 503 (such as RAM), non-volatile 505 (such as ROM, flash memory, etc.) or some combination thereof. In one embodiment, a data resource 505a, and a keyword monetization engine 505b are instantiated in the non-volatile memory 505.

In some embodiments, computing device 500 may be fully or partially implemented in the volatile memory 503 of a computing device 500. Additionally, computing device 500 can include mass storage systems (removable 509 and/or non-removable 511) such as magnetic or optical disks or tape. The computing device 500 can include input devices 513 and/or output devices 515 (e.g., such as a display). In addition, computing device 500 can include network connections 517 to other devices, computers, networks, servers, etc. using either wired or wireless media. As all of these devices are well known in the art, they need not be discussed in detail.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

What is claimed is:

1. A method of predicting keyword monetization for a period of time for one or more advertisements corresponding to a keyword in one or more keyword-advertiser relationships, the method comprising:
    fetching historical data for the one or more keyword-advertiser relationships;
    generating a global model incorporating the one or more keyword-advertiser relationships from the historical data; and
    predicting the keyword monetization based on the historical data for the one or more keyword-advertiser relationships based on the generated global model, the keyword monetization comprising a prediction of performance for the one or more advertisements corresponding to the keyword,
    wherein instructions to perform the fetching, the generating, and the predicting are comprised on computer readable media and, the method comprises executing the instructions with a computing device.

2. The method of claim 1, wherein the predicting further comprises:
    evaluating the one or more keyword-advertiser relationships according to a time-series analysis.

3. The method of claim 2, wherein the generating comprises:
    calculating an average cost per click rate for the keyword from the historical data; and
    calculating an average clickthrough rate for the keyword from the historical data.

4. The method of claim 2, wherein the evaluating comprises:
    predicting a number of impressions for an individual advertisement from an individual keyword-advertiser relationship that will be displayed during the period of time;
    predicting a cost for an advertiser to advertise with the keyword during the period of time;
    predicting a number of clicks to be generated by the individual advertisement from the indvidual keyword-advertiser relationship during the period of time;
    predicting a bidding price for the keyword for the period of time; and
    predicting a number of conversions to be generated by the individual advertisement from an individual keyword-advertiser relationship during the period of time.

5. The method of claim 2, wherein the evaluating further comprises predicting an average position in which an individual advertisement from an individual keyword-advertiser relationship will be displayed in a search return list generated by a search engine in response to a search query which includes the keyword, the search return list being generated during the period of time.

6. The method of claim 5, wherein the predicting the average position comprises:
    calculating a historical average position in which the individual advertisement is displayed in other search return lists generated by the search engine in response to other search queries that include the keyword; and
    applying one or more regression models to the historical average position.

7. The method of claim 6, wherein the one or more regression models comprise:
    a linear regression model;
    a least-square regression model; or
    a slope-based regression model.

8. The method of claim 5 wherein the predicting the average position further comprises finding a corresponding period of time to be predicted from the historical data of the individual keyword-advertiser relationship.

9. The method of claim 4, wherein the predicting the number of impressions for the individual advertisement from the individual keyword-advertiser relationship further comprises applying constraints from the generated global model.

10. The method of claim 4, wherein the predicting the number of conversions further comprises calculating an average value of the performance.

11. A method for generating a keyword performance landscape for one or more keyword-advertiser relationships representing one or more advertisers with one or more advertisements corresponding to a keyword, the method comprising:
    connecting to a data resource containing data for the one or more keyword-advertiser relationships, the data including historical data of the one or more keyword-advertiser relationships;
    fetching the historical data for the one or more keyword-advertiser relationships, the historical data including a historical keyword monetization property for the one or more keyword-advertiser relationships;
    predicting a future keyword monetization property comprising a prediction of a performance for the one or more advertisements corresponding to the keyword for a period of time, wherein the predicting the future keyword monetization property includes generating a global model incorporating the one or more keyword-advertiser relationships and evaluating the one or more keyword-advertiser relationships according to a time-series analysis; and
    generating the keyword performance landscape for the one or more keyword-advertiser relationships from the historical data and the predicted future keyword monetization property,
    wherein instructions to perform the connecting, the fetching, the predicting, and the generating are comprised on computer readable media and the method comprises executing the instructions with a computing system.

12. The method of claim 11, wherein the predicted future keyword monetization property comprises:
- an average bidding price for an individual advertisement corresponding to the keyword, the individual advertisement being from an individual keyword-advertiser relationship;
- a number of impressions for the individual advertisement when displayed during the period of time;
- a number of clicks generated by the individual advertisement during the period of time;
- a cost incurred by an individual advertiser of the individual advertisement to advertise with the keyword during the period of time; and
- a number of conversions generated by the individual advertisement during the period of time.

13. The method of claim 12, wherein the predicted future keyword monetization property further comprises an average position in which the individual advertisement is displayed in a search return list generated by a search engine in response to a search query which includes the keyword, the search return list being generated during the period of time.

14. The method of claim 11, wherein the period of time is a day.

15. The method of claim 11 further comprising outputting the keyword performance landscape.

16. A system for generating a keyword performance landscape including one or more keyword-advertiser relationships, the system comprising:
- a computer system having a processing unit coupled to a memory, the memory having computer readable code, which when executed by the processing unit causes the computer system to implement:
  - an advertiser production data resource; and
  - a keyword monetization engine, wherein the keyword monetization engine predicts monetization by predicting performance of advertisements corresponding to a keyword for a duration of time by generating a global model incorporating the one or more keyword-advertiser relationships and evaluating the one or more keyword-advertiser relationships according to a time-series analysis, generating the keyword performance landscape from the global model and time series analysis, and outputting the keyword performance landscape.

17. The system according to claim 16, wherein the advertisements are displayed on a remote computing device.

18. The system according to claim 17, wherein the remote computing device is another computer system.

19. The system according to claim 17, wherein the remote computing device is a hand-held computing device.

20. The system according to claim 17, wherein the advertisements are displayed in a search result list generated by a search engine that is accessed by a user over the Internet.

21. The method of claim 1, wherein the fetching comprises referencing the historical data, the historical data corresponding to advertising between a plurality of advertisers and a plurality of advertiser publishers with respect to the keyword.

22. The method of claim 1, wherein the fetching comprises referencing the historical data, the historical data corresponding to a plurality of advertising campaigns engaged in by the one or more keyword-advertiser relationships.

23. The method of claim 11, wherein the fetching comprises referencing the historical data, the historical data being for advertising between a plurality of advertisers and a plurality of advertiser publishers with respect to the keyword.

24. The method of claim 11, wherein the fetching comprises referencing the historical data, the historical data corresponding to a plurality of advertising campaigns engaged by the one or more keyword-advertiser relationships.

\* \* \* \* \*